United States Patent [19]

Sanda

[11] Patent Number: 5,484,251
[45] Date of Patent: Jan. 16, 1996

[54] APPARATUS FOR OVERTURNING LONG-WEB ROLLS

[75] Inventor: Akihiro Sanda, Kanagawa, Japan

[73] Assignee: Fuji Photo Film Co., Ltd., Kanagawa, Japan

[21] Appl. No.: 331,750

[22] Filed: Oct. 31, 1994

[30] Foreign Application Priority Data

Nov. 1, 1993 [JP] Japan .................... 5-273553

[51] Int. Cl.$^6$ .................................. B66C 1/62
[52] U.S. Cl. .................... 414/731; 414/741; 414/778; 414/783; 901/39; 294/119.1
[58] Field of Search .................. 414/731, 741, 414/763, 773, 778, 783; 294/88, 119.1; 901/39

[56] References Cited

U.S. PATENT DOCUMENTS

| | | |
|---|---|---|
| 2,207,893 | 7/1940 | Nash et al. . |
| 3,883,016 | 5/1975 | Simpatico .................. 414/763 |
| 3,884,362 | 5/1975 | Brenner et al. . |
| 4,822,091 | 4/1989 | Vermeer et al. .................. 294/119.1 |
| 5,186,515 | 2/1993 | Goldberg et al. .................. 294/119.1 |

FOREIGN PATENT DOCUMENTS

| | | |
|---|---|---|
| 442604 | 9/1941 | Belgium . |
| 1093326 | 5/1955 | France . |
| 1363024 | 4/1964 | France . |
| 941600 | 4/1956 | Germany ............. 414/778 |
| 239751 | 8/1986 | Germany ............. 294/119.1 |
| 3928186 | 3/1991 | Germany . |
| 5672852 | 6/1981 | Japan . |
| 4112172 | 4/1992 | Japan . |
| 5058597 | 3/1993 | Japan . |
| 1172726 | 8/1985 | U.S.S.R. ............. 414/783 |
| 1294620 | 7/1987 | U.S.S.R. ............. 414/778 |
| 697183 | 9/1953 | United Kingdom . |
| 1582559 | 1/1981 | United Kingdom ............. 414/763 |

Primary Examiner—Michael S. Huppert
Assistant Examiner—Douglas A. Hess
Attorney, Agent, or Firm—Sughrue, Mion, Zinn, Macpeak & Seas

[57] ABSTRACT

An apparatus for overturning a long-web roll comprises chucks for holding the long-web roll, which is placed on a first resting surface, by nipping an outer circumference of the long-web roll from both sides in the radial direction, and stop plates capable of being set at supporting positions that stand facing a front end face of the long-web roll, which is held by the chucks, the front end face being directed towards the side of a second resting surface. A rotating transfer device rotates the stop plates and the chucks together with each other by an angle of approximately 90° and thereby places the long-web roll, which is held by the chucks, on the second resting surface such that the front end face may rest on the second resting surface. After the rotating transfer device begins operating, a device moves the chucks with respect to the stop plates, which are set at the supporting positions, in the direction along the wind-up axis of the long-web roll and thereby brings the front end face of the long-web roll into contact with the stop plates.

5 Claims, 10 Drawing Sheets

APPARATUS FOR OVERTURNING LONG-WEB ROLLS

BACKGROUND OF THE INVENTION

1. Field of the Invention

This invention relates to an apparatus for overturning a roll, into which a long web has been wound up, from the state, in which the wind-up axis of the roll of the long web is approximately horizontal, to the state, in which the wind-up axis is approximately vertical.

2. Description of the Prior Art

As described in, for example, Japanese Unexamined Patent Publication No. 4(1992)-112172, long webs of photographic materials, and the like, are ordinarily wound up into rolls and dealt with in the form of the rolls. In many cases, the long web of this type is wound up in a wind-up apparatus into a roll such that the wind-up axis of the roll may be approximately horizontal. The tail end of the long web is then secured to the long-web roll. When the long-web roll is conveyed to the next process, in general, the long-web roll is conveyed by a conveyor in a stable orientation such that the wind-up axis of the long-web roll may be approximately vertical. Therefore, it is necessary to utilize an apparatus for overturning the long-web roll from the state, in which the wind-up axis of the long-web roll is approximately horizontal, to the state, in which the wind-up axis is approximately vertical.

Figure 10A:
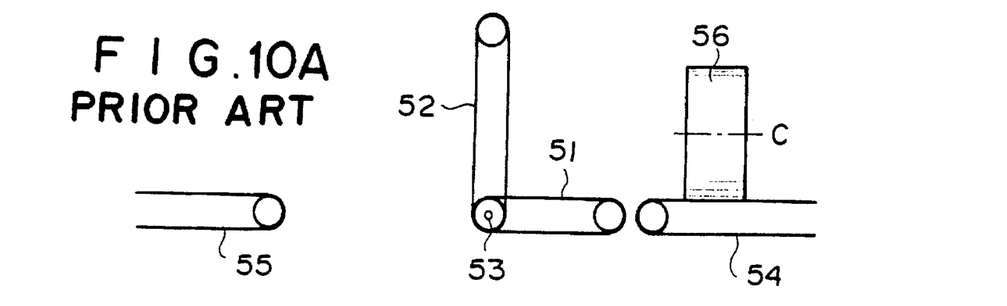
FIGS. 10A, 10B, 10C, and 10D are side views showing steps of an overturning operation of a conventional apparatus for overturning a long-web roll.
Figure 10B:
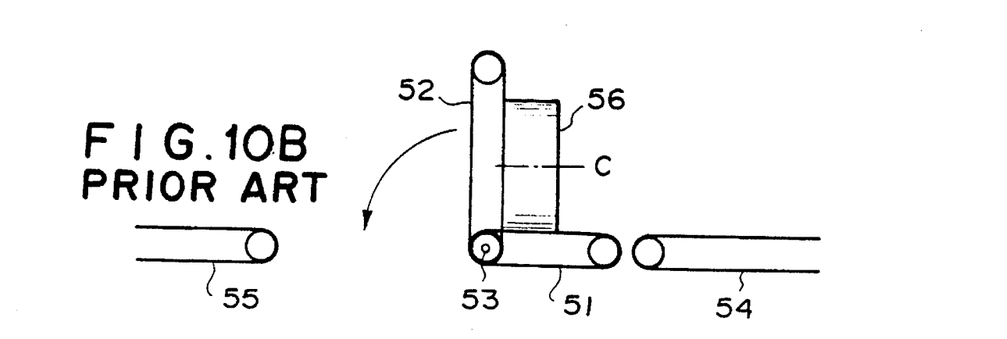
Figure 10C:
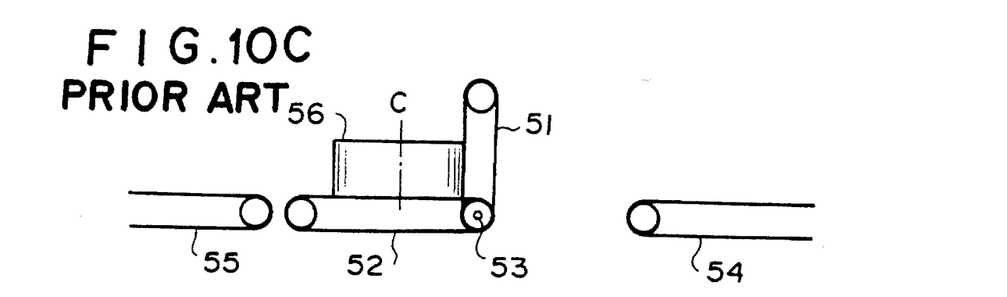
Figure 10D:
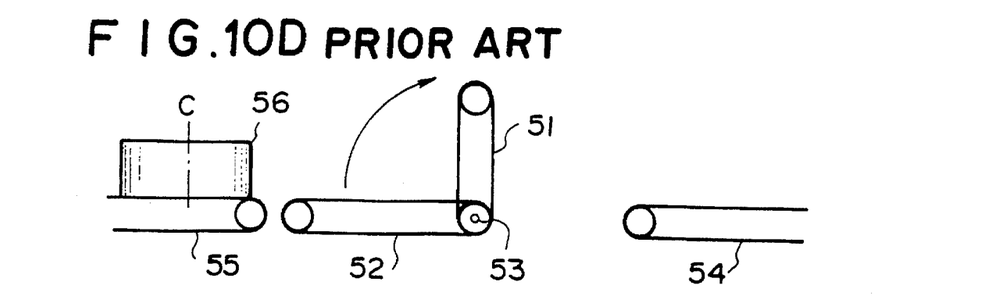

As one of apparatuses for overturning a long-web roll, an apparatus shown in FIGS. 10A, 10B, 10C, and 10D has heretofore been known wherein two belt conveyors 51 and 52 are combined with each other such that they may be normal to each other. The belt conveyors 51 and 52 can be rotated by an angle of 90° around a rotation shaft 53. With the illustrated conventional apparatus, a long-web roll 56 is placed on a belt conveyor 54 in an orientation such that a wind-up axis C of the long-web roll 56 may be approximately horizontal. As illustrated in FIG. 10A, the long-web roll 56, which has thus been conveyed by the belt conveyor 54, is received by the belt conveyor 51. As illustrated in FIG. 10B, the long-web roll 56 is conveyed by the belt conveyor 51 to the position that is in contact with the belt conveyor 52. Thereafter, as illustrated in FIG. 10C, the belt conveyors 51 and 52 are rotated around the rotation shaft 53, and the long-web roll 56 is thereby overturned to the orientation such that the wind-up axis C may be approximately vertical. As illustrated in FIG. 10D, the belt conveyor 52 is then driven in order to deliver the long-web roll 56 onto a belt conveyor 55.

With the conventional apparatus described above, the overturning operation cannot be begun immediately after the long-web roll 56 is received by the belt conveyor 51. The overturning operation can be begun only after the long-web roll 56 has been conveyed to the position shown in FIG. 10B. Also, after the overturning operation has been finished, the belt conveyors 51 and 52 cannot be immediately returned to the original positions. Specifically, as illustrated in FIG. 10D, only after the long-web roll 56 has been completely discharged from the belt conveyor 52 onto the belt conveyor 55, the belt conveyors 51 and 52 can be returned to the original positions. Therefore, the processing time per long-web roll cannot be kept short.

Further, the illustrated conventional apparatus is not provided with a means for holding the long-web roll 56 on the belt conveyors 51 and 52. Therefore, there is the risk that the position of the long-web roll 56 shifts due to inertia during the overturning operation, and the long-web roll 56 is thus scratched. Furthermore, there is the risk that the long-web roll 56 jumps up and down during the overturning operation. Accordingly, the problems occur in that the speed, with which the overturning operation is carried out, cannot be kept high.

As one of overturning apparatuses which are capable of quickly carrying out the overturning process, an apparatus has been proposed in, for example, Japanese Unexamined Utility Model Publication No. 56(1981)-72852, wherein articles are fed one after another onto a rotating impeller. The proposed conventional overturning apparatus is not provided with a means for holding the articles to be overturned. Therefore, there is the risk that the articles are scratched due to shift in position.

As one of overturning apparatuses provided with a mechanism for holding a roll, an apparatus has been proposed in, for example, Japanese Unexamined Patent Publication No. 5(1993)-58597, wherein a shaft provided with the holding mechanism is inserted into a core (i.e., a bobbin around which an electric wire has been wound up). With the proposed overturning apparatus, only the core is held. Therefore, in cases where the proposed overturning apparatus is applied to a long-web roll, the problems occur in that outer loops of the long web in the roll deviate in position along the axial direction of the long-web roll.

SUMMARY OF THE INVENTION

The primary object of the present invention is to provide an apparatus for overturning a long-web roll, wherein the operation for overturning a long-web roll is capable of being carried out quickly.

Another object of the present invention is to provide an apparatus for overturning a long-web roll, wherein the problems are prevented from occurring in that the long-web roll is scratched and in that loops of the long web in the roll deviate in position along the axial direction of the long-web roll.

The present invention provides a first apparatus for overturning a long-web roll, wherein a long-web roll, into which a long web has been wound up and which is placed on a first resting surface in a state such that a wind-up axis of the long-web roll may be approximately parallel to the first resting surface, is overturned to a state, in which the wind-up axis is approximately vertical, and transferred onto a second resting surface, the apparatus comprising:

i) a chucking means for holding the long-web roll, which is placed on the first resting surface, by nipping an outer circumference of the long-web roll from both sides in the radial direction, ii) a supporting means capable of being set at a supporting position that stands facing a front end face of the long-web roll, which is held by the chucking means, the front end face being directed towards the side of the second resting surface, iii) a rotating transfer means for rotating the supporting means and the chucking means together with each other by an angle of approximately 90° and thereby placing the long-web roll, which is held by the chucking means, on the second resting surface such that the front end face may rest on the second resting surface, and iv) a means for moving the chucking means with respect to the supporting means, which is set at the supporting position, in the direction along the wind-up axis of the long-web roll after the rotating transfer means begins operating, and thereby bringing the front end face of the long-web roll into contact with the supporting means.

The present invention also provides a second apparatus for overturning a long-web roll, wherein the first apparatus for overturning a long-web roll in accordance with the present invention is modified such that the supporting means may comprise a pair of members, which stand facing opposite peripheral regions of the front end face of the long-web roll when the supporting means is set at the supporting position, and the pair of the members of the supporting means, which is set at the supporting position, come to positions on the sides outward from the second resting surface and do not interfere with the second resting surface when the long-web roll is placed on the second resting surface.

With the apparatus for overturning a long-web roll in accordance with the present invention, the operation for overturning the long-web roll is carried out while the outer circumference of the long-web roll is being nipped and held by the chucking means. Therefore, the problems can be reliably prevented from occurring in that the long-web roll shifts in position during the overturning operation and is thus scratched.

Also, the front end face of the long-web roll, that stands facing the direction to which the long-web roll is overturned, is brought into contact with the supporting means and is thereby supported. Therefore, when the overturning operation proceeds and the long-web roll comes close to the overturned orientation (in which the wind-up axis is approximately vertical), the inner loops in the long-web roll do not fall earlier than the loops at the outer circumference of the long-web roll, which is held by the chucking means. Thus the loops in the long-web roll do not deviate in position along the axial direction of the long-web roll.

The deviation in position of the loops in the long-web roll does not occur at the initial stage of the overturning operation, i.e. while the long-web roll is being in the orientation close to the upright orientation (in which the wind-up axis of the long-web roll is approximately horizontal). Therefore, even if the front end face of the long-web roll is brought into contact with the supporting means after the overturning operation is begun, no problem will occur.

Further, with the apparatus for overturning a long-web roll in accordance with the present invention, no configuration for the conveyance of the long-web roll is provided in the overturning system. Therefore, the overturning operation of the overturning system and the returning operation of the overturning system to the original position need not wait for the completion of the conveyance of the long-web roll in the overturning system. Accordingly, the overturning processes can be quickly carried out one after another.

With the apparatus for overturning a long-web roll in accordance with the present invention, the chucking means (and consequently the long-web roll) is moved with respect to the supporting means in the overturning system. The movement of the chucking means with respect to the supporting means is carried out after the overturning operation is begun. Therefore, the overturning operation is not delayed due to the movement of the chucking means with respect to the supporting means, and the overturning process can be carried out quickly.

In particular, with the second apparatus for overturning a long-web roll in accordance with the present invention, the supporting means does not interfere with the second resting surface. Therefore, it is not necessary to carry out an operation for retracting the supporting means before the front end face of the long-web roll supported by the supporting means arrives at the second resting surface. Accordingly, the transfer of the long-web roll onto the second resting surface can be carried out smoothly.

As will be understood from the specification, it should be noted that the term "moving a chucking means with respect to a supporting means" as used herein means movement of the chucking means relative to the supporting means, and embraces both the cases wherein the chucking means is moved while the supporting means is kept stationary, and cases wherein the supporting means is moved while the chucking means is kept stationary.

DESCRIPTION OF THE PREFERRED EMBODIMENTS

The present invention will hereinbelow be described in further detail with reference to the accompanying drawings.

Figure 1:
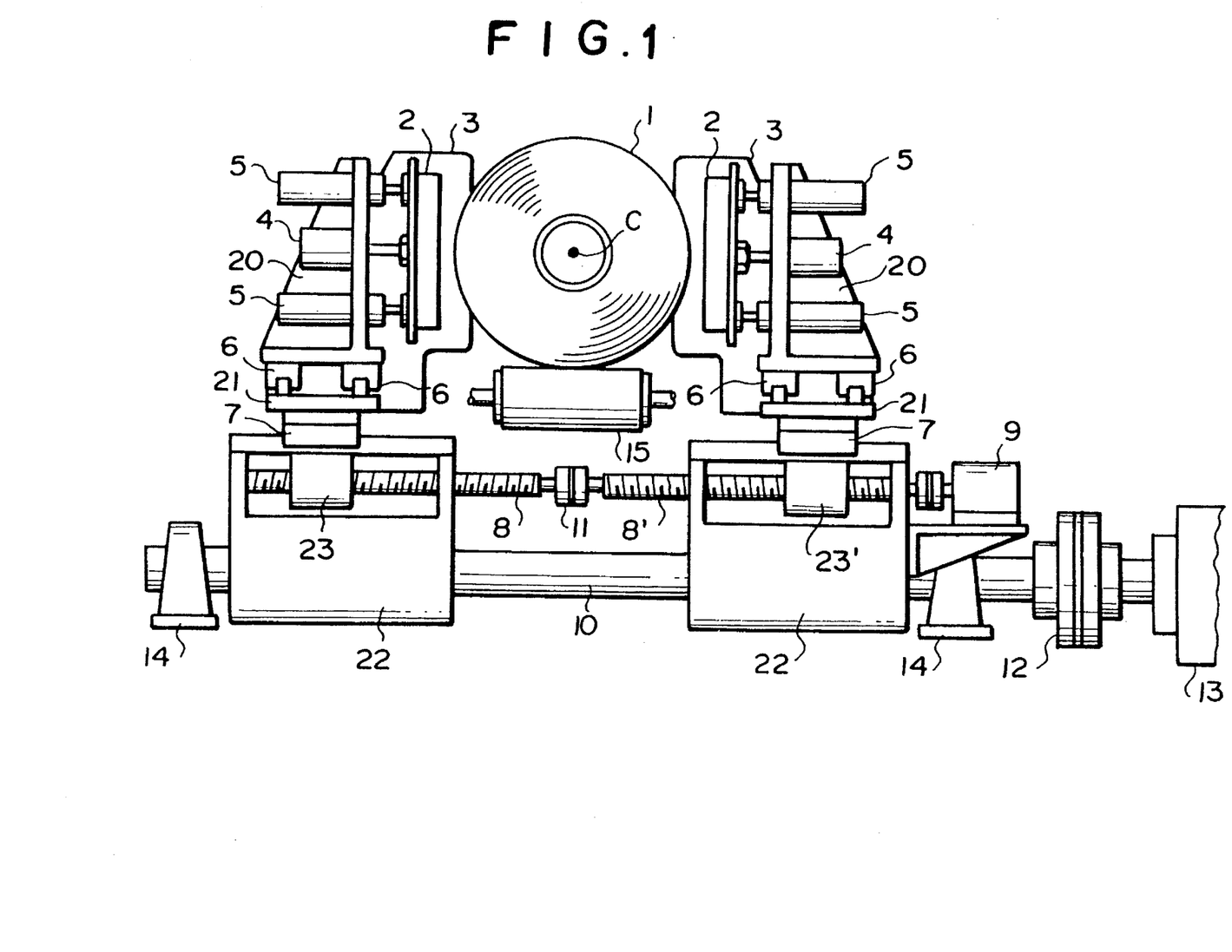
FIG. 1 is a front view showing an embodiment of the apparatus for overturning a long-web roll in accordance with the present invention.
Figure 2:
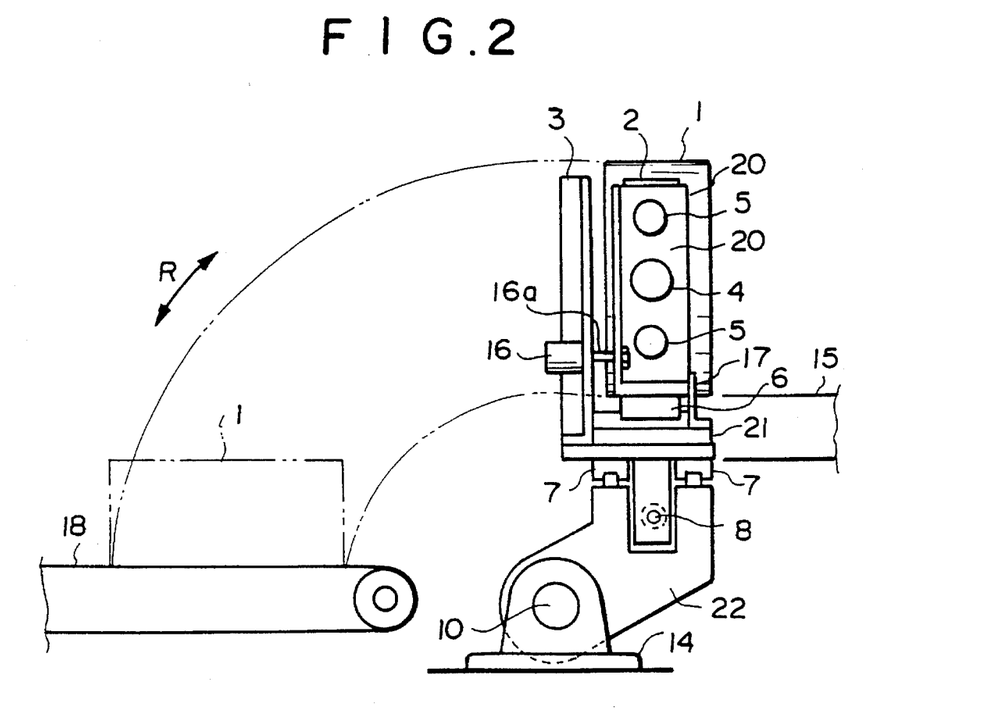
FIG. 2 is a side view showing the embodiment of FIG. 1.
Figure 3:
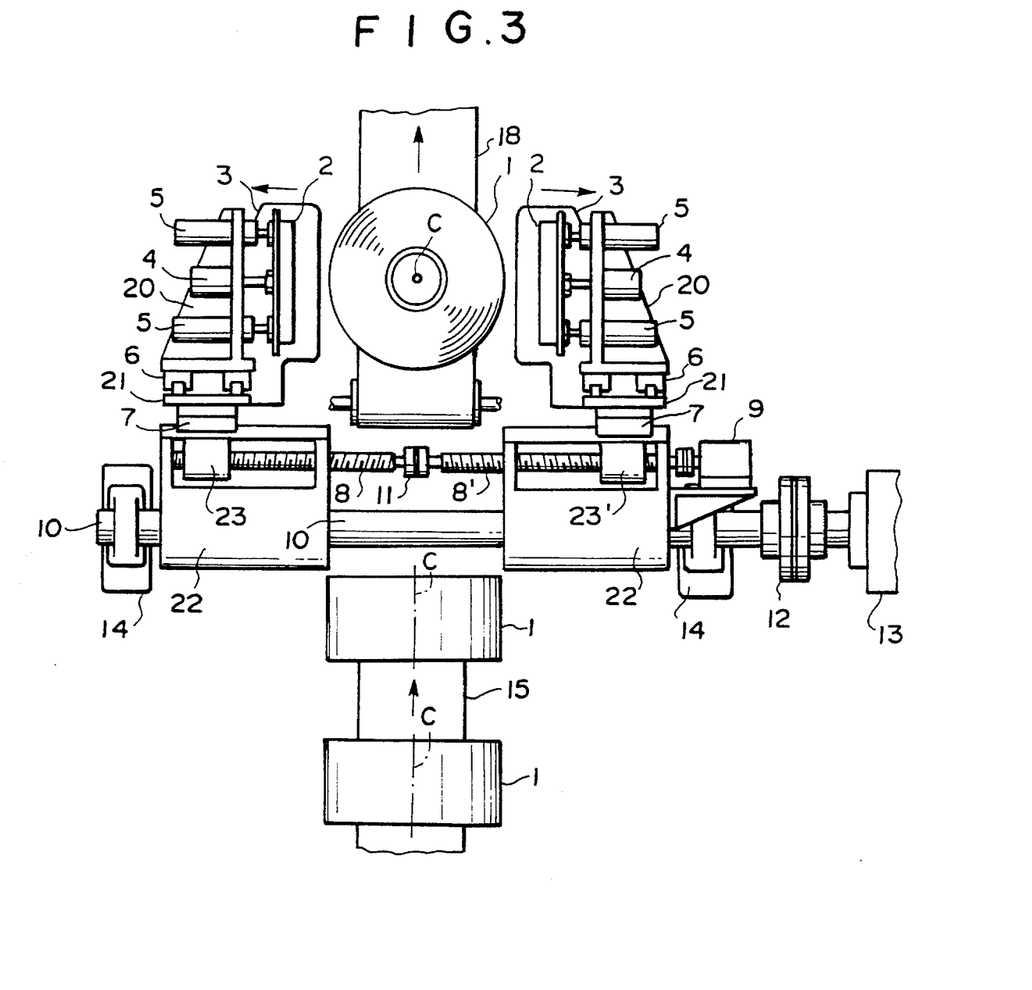
FIG. 3 is a plan view showing the embodiment of FIG. 1.

FIG. 1 is a front view showing an embodiment of the apparatus for overturning a long-web roll in accordance with the present invention. FIG. 2 is a side view showing the embodiment of FIG. 1. FIG. 3 is a plan view showing the embodiment of FIG. 1. The illustrated apparatus overturns a long-web roll 1, into which a long web, such as a photographic material, has been wound up. The long-web roll 1 is placed on an upper surface of a product feed conveyor 15 in an orientation such that a wind-up axis C of the long-web roll 1 may be approximately horizontal and parallel to the direction of conveyance of the product feed conveyor 15. The upper surface of the product feed conveyor 15 serves as a first resting surface.

This overturning apparatus is provided with a pair of chucks 2, 2, which are located on opposite sides outward from the long-web roll 1 having the orientation described above, and a pair of stop plates 3, 3, which serve as a supporting means. Each chuck 2 is mounted on a frame 20 via a pair of linear bushes 5, 5 such that the chuck 2 can move rightwardly and leftwardly in FIG. 1. Each chuck 2 is moved by an air cylinder 4 in the direction described above. Each frame 20 is mounted on a slide base 21 via slide guides 6, 6 such that the frame 20 can move in the width direction of the long-web roll 1, i.e. rightwardly and leftwardly in FIG. 2. Each stop plate 3 is secured to the slide base 21 and provided with an air cylinder 16. The leading end of a piston 16a of the air cylinder 16 is secured to the frame 20. Therefore, when the piston 16a of the air cylinder 16 is extended and contracted, the frame 20 is moved rightwardly and leftwardly in FIG. 2.

Each slide base 21 is mounted on a rotatable base 22 via slide guides 7, 7 such that the slide base 21 can move in the radial direction of the long-web roll 1, i.e. rightwardly and leftwardly in FIG. 1. Also, the slide bases 21, 21 are respectively connected to internal thread blocks 23, 23'. The internal thread blocks 23, 23' are respectively engaged with ball screws 8, 8', which are held by the rotatable bases 22, 22 and can rotate. The ball screws 8, 8' are constituted of reversing screws and are combined together by a coupling 11. When the ball screws 8, 8' are rotated by a motor 9, the slide bases 21, 21 are linearly moved in directions heading towards each other or in directions heading away from each other in accordance with the direction of rotation of the ball screws 8, 8'.

Each rotatable base 22 is secured to a rotation main shaft 10. When the rotation main shaft 10 is rotated clockwise or counter-clockwise by a motor 13 via a coupling 12, each rotatable base 22 is rotated in directions indicated by the double headed arrow R. The rotation main shaft 10 is supported by bearing units 14, 14 such that the rotation main shaft 10 can rotate smoothly.

Figure 4:
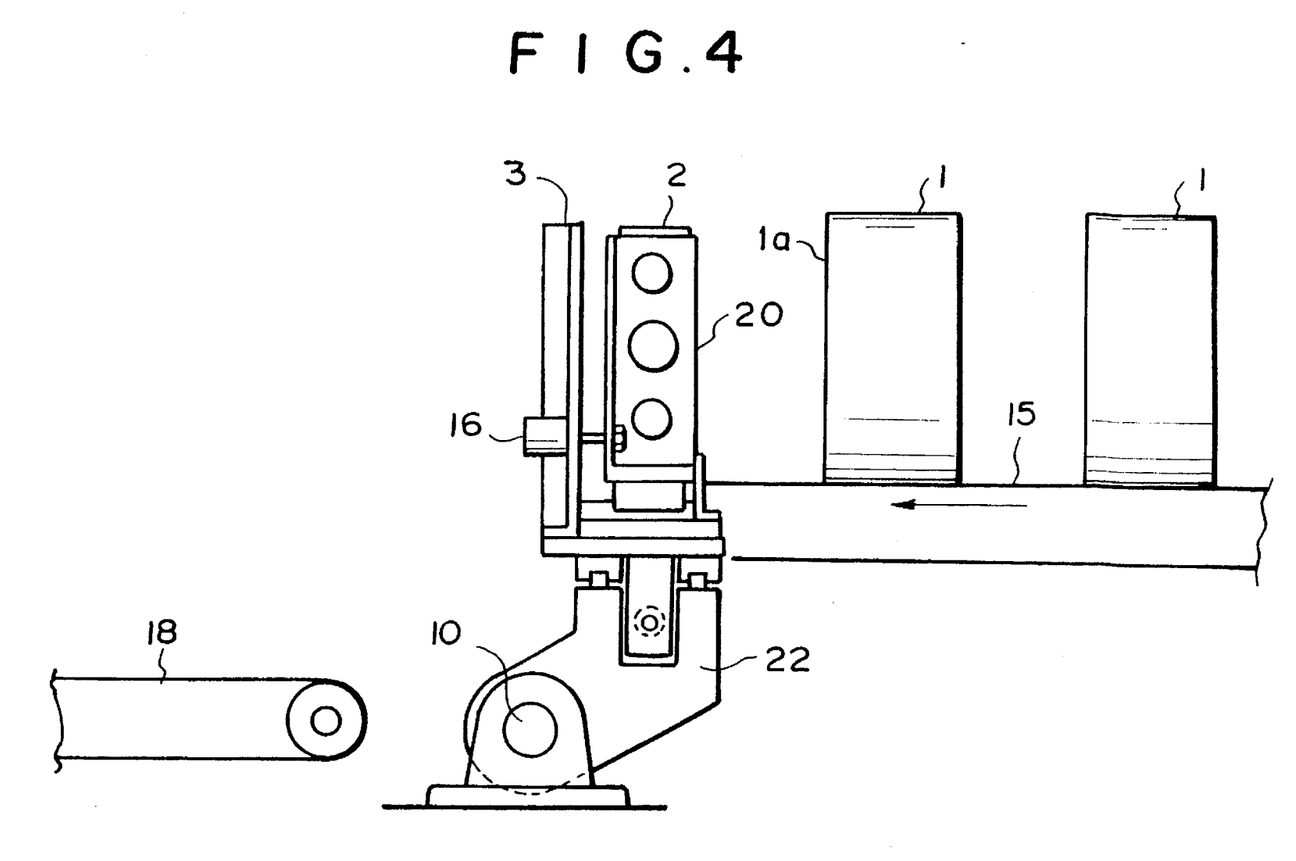
FIG. 4 is a side view showing the state of the embodiment of FIG. 1 before an overturning operation is begun.

How this embodiment operates will be described hereinbelow with reference to FIGS. 4 through 9. As illustrated in FIG. 4, the long-web rolls 1, 1, . . . which have been formed in the preceding process, are placed in the orientation described above on the product feed conveyor 15 and conveyed one after another by the product feed conveyor 15 towards the overturning apparatus. At this time, the pair of chucks 2, 2 are set at positions spaced a distance, which is larger than the diameter of the long-web roll 1, from each other such that they may not interfere with the long-web roll 1 conveyed to the overturning apparatus. Also, the stop plates 3, 3 are set at the supporting positions, which are spaced a distance smaller than the diameter of the long-web roll 1 from each other and which respectively stand facing the opposite peripheral regions of a front end face 1a of the long-web roll 1 (i.e. the end face that stands facing the side of a conveyor 18, which will be described later). The setting of the positions of the chucks 2, 2 and the stop plates 3, 3 is carried out by driving the motor 9 in accordance with the diameter of the long-web roll 1 and thereby moving the slide bases 21, 21 rightwardly and leftwardly in FIG. 1.

Figure 5:
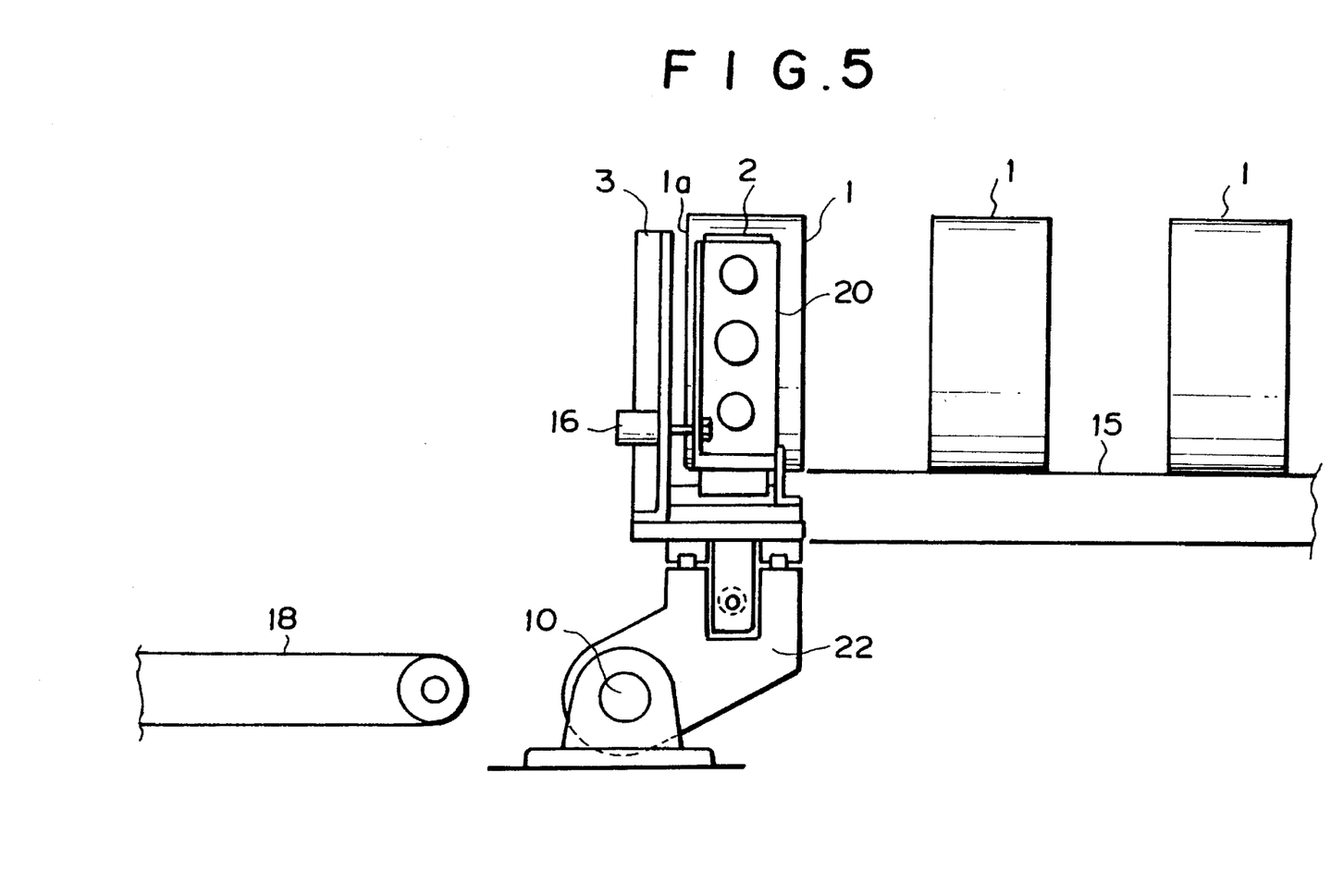
FIG. 5 is a side view showing the state of the embodiment of FIG. 1 at an initial stage of an overturning operation.

As illustrated in FIG. 5, when the front end face 1a of the first long-web roll 1 is brought to the position immediately before the position that is in contact with the stop plates 3, 3, the product feed conveyor 15 is stopped by a photoelectric switch (not shown). At this time, the timing, with which the conveyor 15 is stopped, is set such that the distance between the front end face 1a of the long-web roll 1 and the stop plates 3, 3 is not larger than the distance of movement of the frame 20 carried out by the air cylinder 16. FIG. 1 shows the frontal configuration of the overturning apparatus at the time at which the conveyor 15 is stopped in the manner described above.

Figure 6:
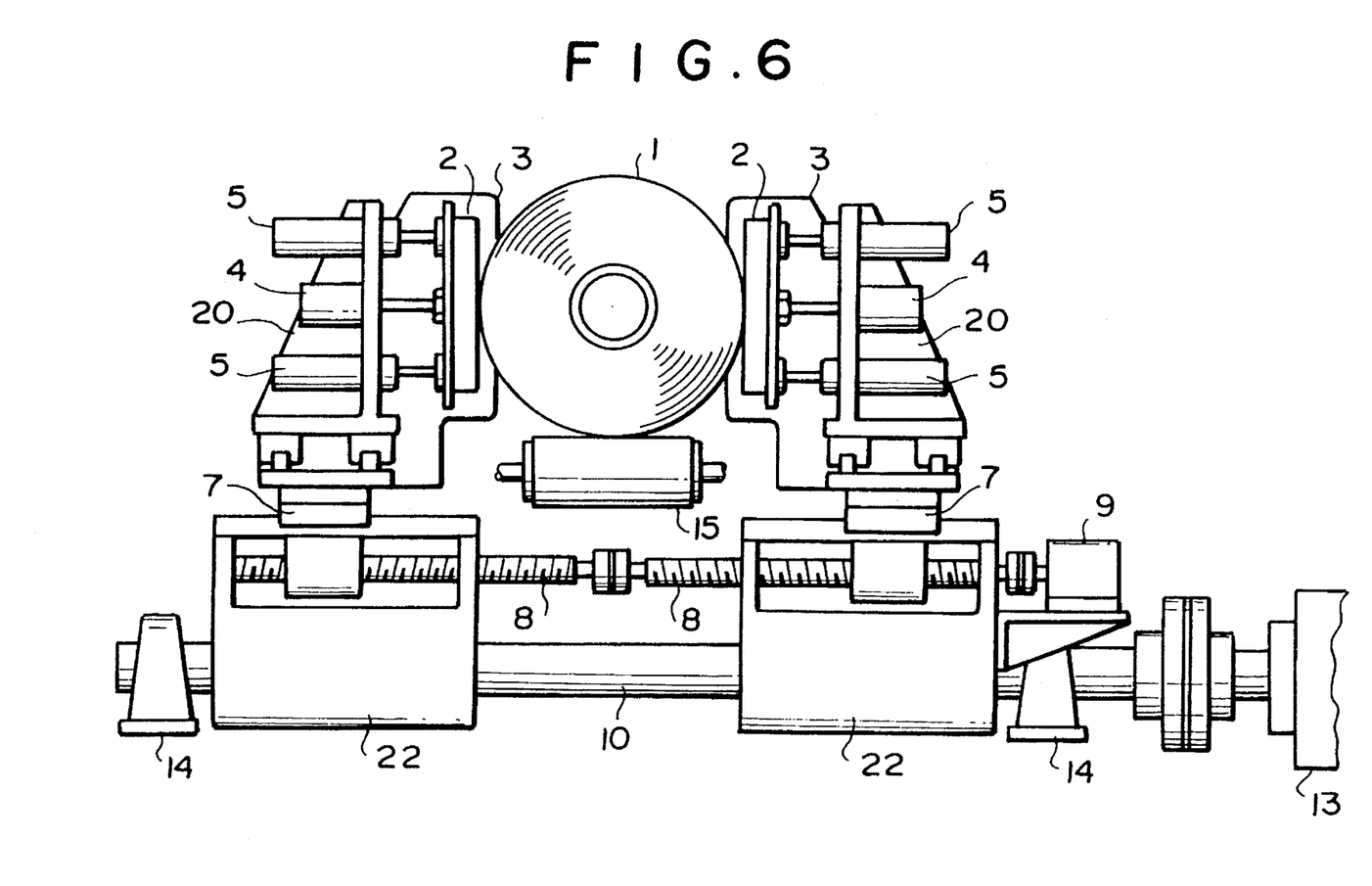
FIG. 6 is a front view showing the state of the embodiment of FIG. 1 in which a chucking means holds a long-web roll.

After the conveyor 15 is stopped, the air cylinders 4, 4 are operated in order to move the chucks 2, 2 in the directions heading towards each other. In this manner, the chucks 2, 2 hold the long-web roll 1 by nipping the outer circumferential portions of the long-web roll 1 from both sides. The frontal configuration at this time is shown in FIG. 6. The portions of the chucks 2, 2, which come into contact with the long-web roll 1, are constituted of an elastic material, such as rubber or sponge. Therefore, the chucks 2, 2 can hold the long-web roll 1 reliably such that they may not scratch the outer circumferential portions of the long-web roll 1 and may not slip along the outer circumferential portions of the long-web roll 1.

Figure 7:
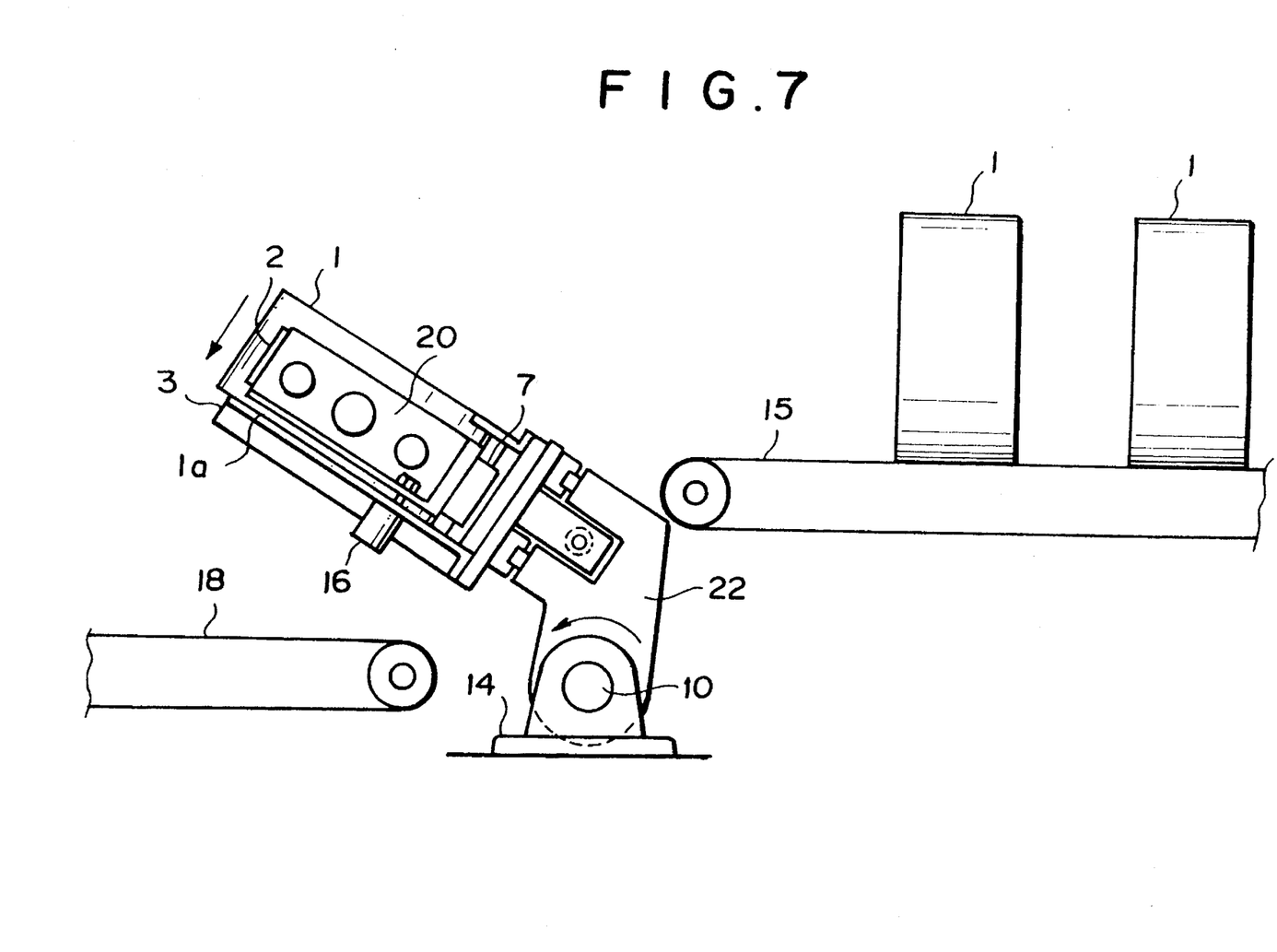
FIG. 7 is a side view showing the state of the embodiment of FIG. 1 in which an overturning operation is being carried out.

When the chucks 2, 2 have held the long-web roll 1, the motor 13 is driven in order to rotate the rotation main shaft 10 counter-clockwise in FIG. 2. As a result, as illustrated in FIG. 7, the rotatable bases 22, 22 rotate together with the rotation main shaft 10, and the long-web roll 1, which is held by the chucks 2, 2, is brought down towards the side of the conveyor 18. Immediately after the rotating operation of the rotatable bases 22, 22 begins, the air cylinders 16, 16 are driven in order to move the frames 20, 20 in the direction heading towards the stop plates 3, 3. In this manner, the front end face 1a of the long-web roll 1 is brought into contact with the stop plates 3, 3. The front end face 1a of the long-web roll 1 is thus supported by the stop plates 3, 3 before the long-web roll 1 is inclined by a large angle. Therefore, the inner loops in the long-web roll 1 do not fall earlier than the loops at the outer circumference of the long-web roll 1. Thus the loops in the long-web roll 1 do not deviate in position along the axial direction of the long-web roll 1.

Also, the long-web roll 1 is overturned while it is being held between the chucks 2, 2. Therefore, the problems can be reliably prevented from occurring in that the long-web roll 1 shifts in position during the overturning operation and is thus scratched.

Figure 8:
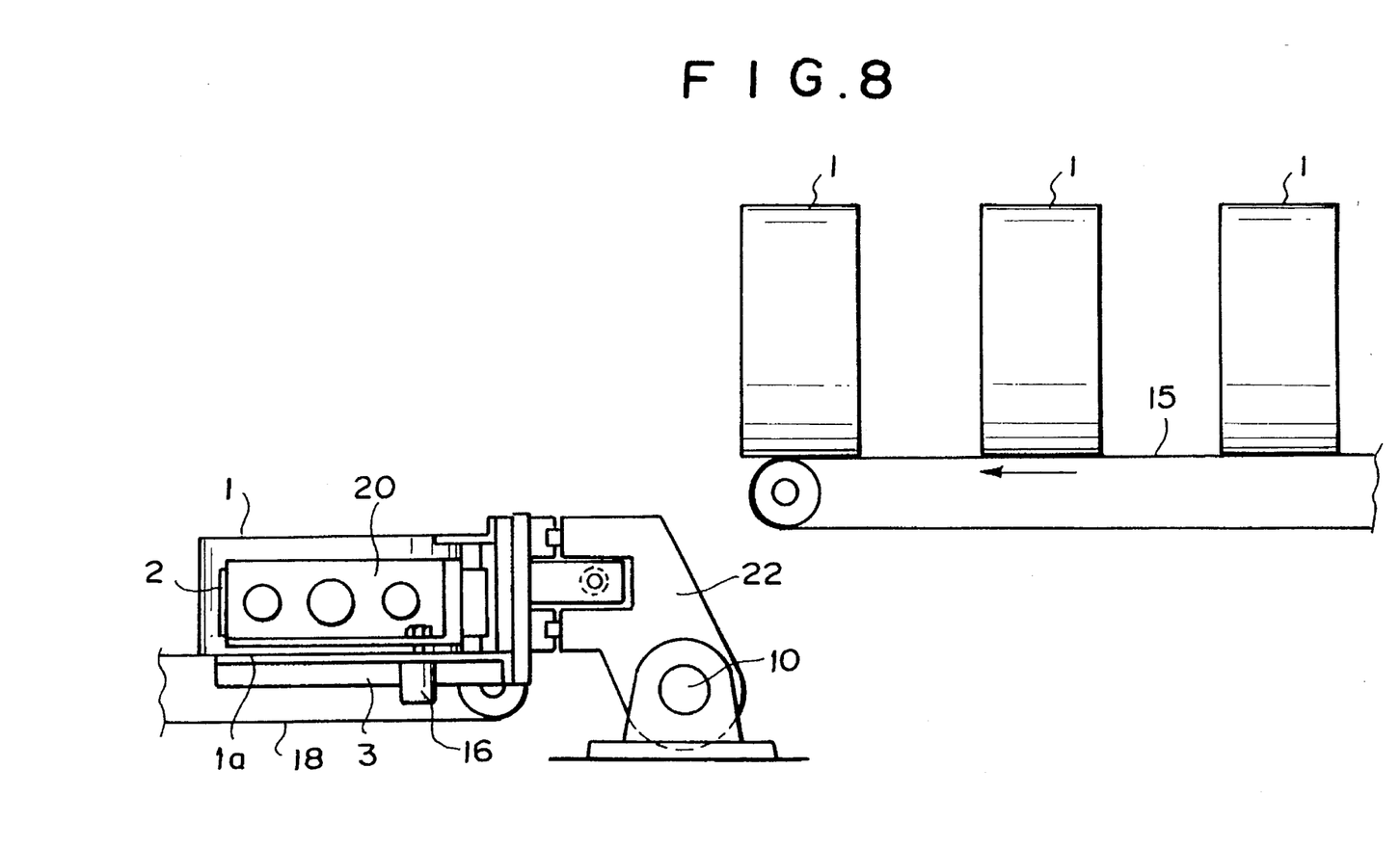
FIG. 8 is a side view showing the state of the embodiment of FIG. 1 in which an overturning operation is finished.
Figure 9:
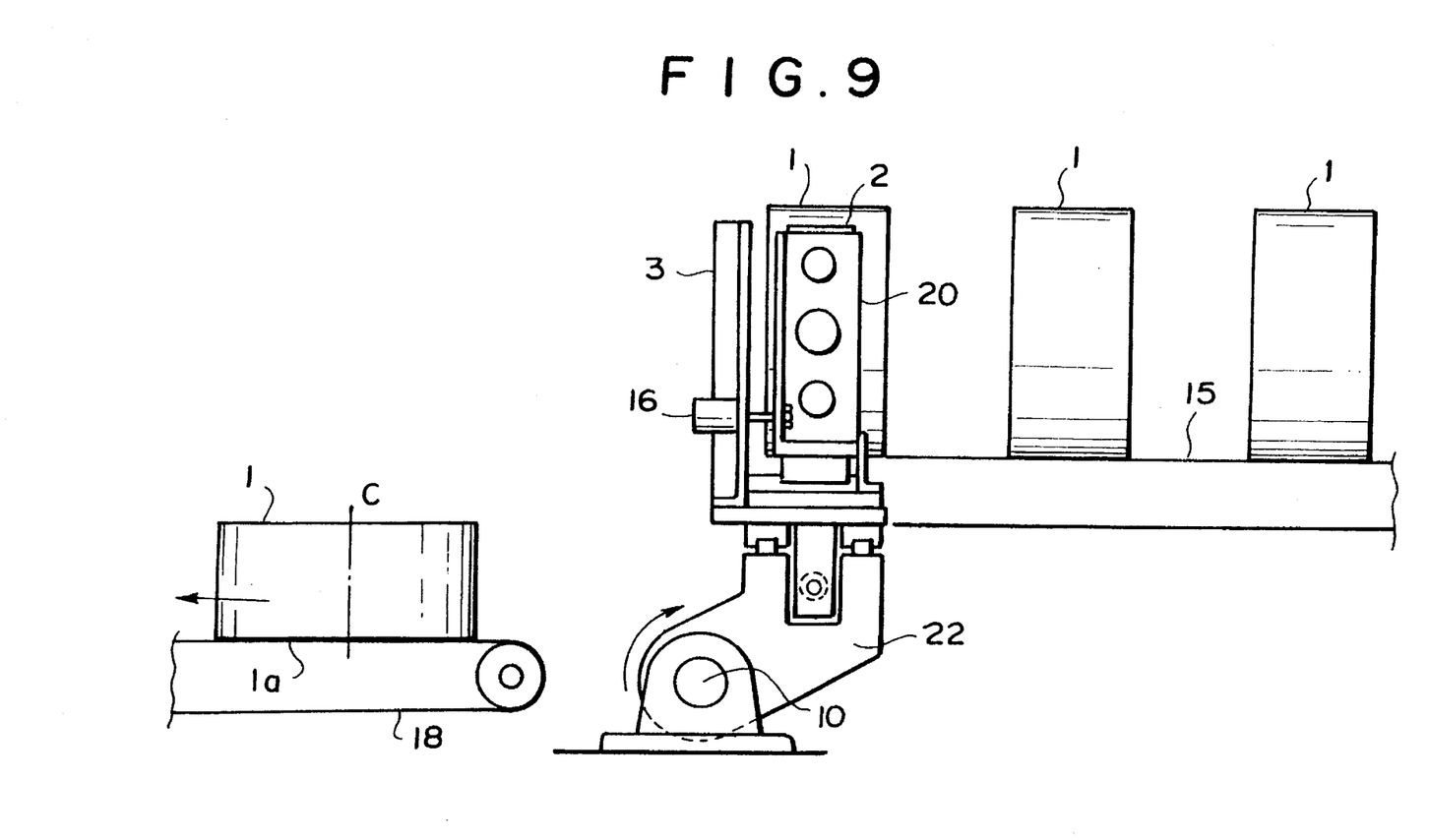
FIG. 9 is a side view showing the state of the embodiment of FIG. 1 which has returned to its initial state.

As illustrated in FIG. 8, when the rotation main shaft 10 has rotated 90°, the front end face 1a of the long-web roll 1 is placed on the upper surface of the conveyor 18, and the motor 13 is stopped. Also, the air cylinders 4, 4 are operated reversely in order to move the chucks 2, 2 in the directions heading away from each other. Further, the motor 9 is operated, and the slide bases 21, 21 are moved outwardly until the distance between the stop plates 3, 3 becomes larger than the diameter of the long-web roll 1. (This state is shown in FIG. 3.) In this manner, the long-web roll 1 is released from the chucks 2, 2 and the stop plates 3, 3. As illustrated in FIG. 9, the long-web roll 1 is thus overturned to the state, in which the wind-up axis C is approximately vertical, and is placed on the conveyor 18.

When the stop plates 3, 3 are set at the positions for supporting the front end face 1a of the long-web roll 1, the distance between the stop plates 3, 3 is larger than the entire width of the conveyor 18. Therefore, when the long-web roll 1 is placed on the conveyor 18, even if the stop plates 3, 3 are kept at the positions for supporting the long-web roll 1, they will not interfere with the conveyor 18, and the transfer of the long-web roll 1 can be carried out smoothly.

Thereafter, the conveyor 18 is operated to deliver the long-web roll 1 to the next process. Also, the motor 13 is operated reversely in order to rotate the rotation main shaft 10 by an angle of 90° clockwise in FIG. 9. In this manner, the chucks 2, 2 and the stop plates 3, 3 are returned to the position for rotation shown in FIG. 4. During the operation for returning to the original position, the motor 9 is operated in order to move the slide bases 21, 21. In this manner, the chucks 2, 2 and the stop plates 3, 3 are returned to the positions for receiving the long-web roll 1, which are shown in FIG. 1. Also, during the returning operation, the air cylinders 16, 16 are operated in order to return the frames 20, 20 to the initial positions shown in FIG. 2. The initial positions of the frames 20, 20 are defined by stoppers 17, 17. Thereafter, the operations described above are repeated, and the long-web rolls 1, 1, . . . are subjected to the overturning process one after another.

As described above, with this embodiment, the long-web roll 1 is not conveyed in the system for overturning the long-web roll 1. Therefore, the overturning operations of the chucks 2, 2 and the stop plates 3, 3 and the returning operations of the chucks 2, 2 and the stop plates 3, 3 to the original positions need not wait for the completion of the conveyance of the long-web roll 1 in the overturning system. Accordingly, the overturning processes can be quickly carried out one after another. Specifically, with this embodiment, long-web rolls 1, 1, . . . , each of which has a diameter falling within the range of 150 mm to 450 mm, a width falling within the range of 70 mm to 250 mm, and a weight falling within the range of 1 kg to 15 kg, can be processed within a time of 3 to 5 seconds per long-web roll. On the other hand, with the conventional apparatus shown in FIGS. 10A, 10B, 10C, and 10D, a processing time of 6 to 8 seconds per long-web roll is required for the same long-web rolls as those described above.

What is claimed is:

1. An apparatus for overturning a long-web roll, wherein said long web has been wound up and placed on a first resting surface in a first state such that a longitudinal wind-up axis of the long-web roll is substantially parallel to the first resting surface, then is overturned to a second state, in which the longitudinal wind-up axis is substantially perpendicular to the first state, and transferred onto a second resting surface, the apparatus comprising:

i) a chuck for holding the long-web roll, which is placed on the first resting surface, by nipping an outer circumference of the long-web roll from both sides in a radial direction, ii) a support capable of being set at a supporting position that stands facing a front end face of the long-web roll, which is held by said chuck, said front end face being directed towards the side of the second resting surface, iii) a rotating transfer unit operable for rotating said support and said chuck together with each other by an angle of approximately 90° and thereby placing the long-web roll, which is held by said chuck, on the second resting surface such that said front end face may rest on the second resting surface, and iv) a unit operable for moving said chuck with respect to said support, which is set at said supporting position, in the direction along the wind-up axis of the long-web roll after said rotating transfer unit begins operating, and thereby bringing said front end face of the long-web roll into contact with said support.

2. An apparatus as defined in claim 1 wherein said support comprises a pair of members, which stand facing opposite peripheral regions of said front end face of the long-web roll when said support is set at said supporting position, and the pair of members of said support, which is set at said supporting position, come to positions on the sides outward from the second resting surface and do not interfere with the second resting surface when the long-web roll is placed on the second resting surface.

3. An apparatus as defined in claim 1 wherein the long web is a photographic material.

4. An apparatus as defined in claim 1 wherein the first resting surface is an upper surface of a conveyor.

5. An apparatus as defined in claim 1 wherein the second resting surface is an upper surface of a conveyor.

* * * * *